United States Patent
DeRose et al.

(10) Patent No.: US 9,792,264 B2
(45) Date of Patent: *Oct. 17, 2017

(54) INHERITANCE OF RULES ACROSS HIERARCHICAL LEVELS

(71) Applicant: Microsoft Technology Licensing, LLC, Redmond, WA (US)

(72) Inventors: Pedro Dantas DeRose, Snoqualmie, WA (US); Puneet Narula, Bothell, WA (US); Viktoriya Taranov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/878,011

(22) Filed: Oct. 8, 2015

(65) Prior Publication Data

US 2016/0041953 A1    Feb. 11, 2016

Related U.S. Application Data

(63) Continuation of application No. 13/287,645, filed on Nov. 2, 2011, now Pat. No. 9,189,563.

(51) Int. Cl.
*G06F 7/00*    (2006.01)
*G06F 17/00*   (2006.01)
(Continued)

(52) U.S. Cl.
CPC ...... *G06F 17/2241* (2013.01); *G06F 17/3089* (2013.01); *H04L 41/22* (2013.01)

(58) Field of Classification Search
CPC ...... G06F 15/16; G06F 3/048; G06F 3/04842; G06F 3/0482; G06F 17/2241;
(Continued)

(56) References Cited

U.S. PATENT DOCUMENTS 5,956,707 A    9/1999  Chu
6,122,664 A    9/2000  Boukobza et al.
(Continued)

FOREIGN PATENT DOCUMENTS

CN    1556482 A    12/2004
CN    1609859 A    4/2005
(Continued)

OTHER PUBLICATIONS

U.S. Appl. No. 13/287,997, filed Nov. 2, 2011 entitled "Routing Query Results".

(Continued)

*Primary Examiner* — Azam Cheema

(57) ABSTRACT

Rules, such as condition-action rules, are configured at different levels of a hierarchy. Rules created at a higher hierarchical level are automatically inherited by lower hierarchical levels in the same branch of the hierarchy. The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create a local copy of the rule that is editable. Rules may be ordered and when a lower hierarchical level inherits the rules, the ordering is preserved. While the ordering of any rules remains constant when inherited at the lower levels, the lower level may toggle on/off the execution of each rule within the ordering.

20 Claims, 4 Drawing Sheets

(51) Int. Cl.
  *G06F 17/22* (2006.01)
  *G06F 17/30* (2006.01)
  *H04L 12/24* (2006.01)

(58) Field of Classification Search
  CPC ..... G06F 17/3089; H04L 41/22; H04L 67/02; G06Q 10/10; G06Q 30/018; G06Q 10/067
  See application file for complete search history.

(56) References Cited

U.S. PATENT DOCUMENTS

| | | | |
|---|---|---|---|
| 7,149,738 | B2 | 12/2006 | Kumar et al. |
| 7,162,473 | B2 | 1/2007 | Dumais |
| 7,440,964 | B2 | 10/2008 | Gosse et al. |
| 7,591,010 | B2 | 9/2009 | Shelest et al. |
| 7,640,236 | B1 | 12/2009 | Pogue |
| 7,962,633 | B1 | 6/2011 | Sidebottom et al. |
| 8,041,713 | B2 | 10/2011 | Lawrence |
| 8,341,692 | B1 * | 12/2012 | Boyer ............... H04N 21/2541 726/1 |
| 9,177,022 | B2 | 11/2015 | Taranov |
| 9,189,563 | B2 * | 11/2015 | DeRose ............. G06F 17/3089 |
| 2003/0051020 | A1 | 3/2003 | Kadam et al. |
| 2003/0078914 | A1 | 4/2003 | Witbrock |
| 2004/0215630 | A1 | 10/2004 | Parekh et al. |
| 2004/0243587 | A1 | 12/2004 | Nuyens et al. |
| 2005/0021504 | A1 | 1/2005 | Atchison |
| 2005/0091671 | A1 | 4/2005 | Deem et al. |
| 2005/0138018 | A1 | 6/2005 | Sakai et al. |
| 2005/0154744 | A1 | 7/2005 | Morinville |
| 2006/0036581 | A1 | 2/2006 | Chakrabarti |
| 2006/0167858 | A1 | 7/2006 | Dennis et al. |
| 2006/0224607 | A1 | 10/2006 | Tchaitchian et al. |
| 2006/0236381 | A1 * | 10/2006 | Weeden ............... H04L 63/101 726/6 |
| 2006/0287980 | A1 | 12/2006 | Liu et al. |
| 2007/0219979 | A1 | 9/2007 | Jung |
| 2007/0266002 | A1 | 11/2007 | Chowdhury |
| 2007/0282986 | A1 | 12/2007 | Childress et al. |
| 2007/0294225 | A1 | 12/2007 | Radlinski |
| 2008/0209047 | A1 | 8/2008 | Beigi et al. |
| 2008/0288467 | A1 | 11/2008 | Szeto et al. |
| 2008/0301113 | A1 | 12/2008 | Chi et al. |
| 2009/0094216 | A1 | 4/2009 | Hou et al. |
| 2009/0094234 | A1 | 4/2009 | Marvit |
| 2009/0100015 | A1 | 4/2009 | Golan |
| 2009/0171907 | A1 | 7/2009 | Radovanovic |
| 2009/0234799 | A1 | 9/2009 | Betawadkar-Norwood et al. |
| 2009/0292700 | A1 | 11/2009 | Castellani |
| 2009/0299992 | A1 | 12/2009 | Klinger et al. |
| 2009/0307205 | A1 | 12/2009 | Churchill et al. |
| 2009/0319385 | A1 | 12/2009 | Jackson et al. |
| 2010/0005496 | A1 | 1/2010 | Ellis et al. |
| 2010/0085906 | A1 | 4/2010 | Yamamoto |
| 2010/0106724 | A1 | 4/2010 | Anderson |
| 2010/0145944 | A1 | 6/2010 | Punera |
| 2010/0185678 | A1 | 7/2010 | Dettinger et al. |
| 2010/0223546 | A1 | 9/2010 | Liu |
| 2011/0016104 | A1 | 1/2011 | Leconte |
| 2011/0137902 | A1 | 6/2011 | Wable et al. |
| 2011/0153671 | A1 | 6/2011 | Taniguchi |
| 2011/0208670 | A1 * | 8/2011 | Joseph .................... G06Q 40/06 705/36 R |
| 2011/0246499 | A1 | 10/2011 | Carmel et al. |
| 2011/0265189 | A1 | 10/2011 | Liao et al. |
| 2012/0072406 | A1 | 3/2012 | Iwakura et al. |
| 2012/0089641 | A1 | 4/2012 | Wilde et al. |
| 2013/0046787 | A1 | 2/2013 | Ford et al. |
| 2013/0110795 | A1 | 5/2013 | DeRose et al. |
| 2013/0110813 | A1 | 5/2013 | Holm et al. |
| 2013/0110816 | A1 | 5/2013 | Khan et al. |
| 2013/0110860 | A1 | 5/2013 | Taranov et al. |
| 2017/0132316 | A1 | 5/2017 | Holm et al. |

FOREIGN PATENT DOCUMENTS

| | | |
|---|---|---|
| CN | 101292236 A | 10/2008 |
| CN | 102043833 A | 5/2011 |
| CN | 102165447 A | 8/2011 |
| KR | 10-0714504 | 5/2007 |
| WO | WO 2006/071928 A2 | 7/2006 |

OTHER PUBLICATIONS

U.S. Appl. No. 13/287,999, filed Nov. 2, 2011 entitled "Default Query Rules".

U.S. Appl. No. 13/287,717, filed Nov. 2, 2011 entitled "User Pipeline Configuration for Rule-Based Query Transformation, Generation and Result Display".

U.S. Appl. No. 13/287,645, filed Nov. 2, 2011 entitled "Inheritance of Rules Across Hierarchical Levels".

"Advanced Development Techniques using OBIEE Plus", Retrieved on: Aug. 30, 2011, Available at: http://www.rittmanmead.com/files/Advanced%20Development%20Techniques%20Using%20OBIEE%20Plus.pdf.

Anagnostopoulos et al., "An Optimization Framework for Query Recommendation", Copyright 2010, 10 pages.

Aronis et al., The World: Knowledge Discovery from Multiple Distributed Databases, published 1997, 5 pages.

Curran, Steve, "SharePoint 2010 Search Scopes Explained", Published on: Jul. 23, 2011, Available at: http://sharepointfieldnotes.blogspot com/2011_07_01_archive.html.

Elmongui et al., A Framework for Testing Query Transformation Rules, copyright 2009, 12 pages.

Ioannidis, Yannis E., Query Optimization, Journal of ACM Computing Surveys, vol. 28, Issue 1, published 1996, 38 pages.

"Managing Firewall Services", Retrieved on: Aug. 30, 2011, Available at: http://www.cisco.com/en/US/docs/security/security_management/cisco_security_manager/security_manager/3.1/user/guide/porules.html.

Pirahesh, et al., "A Rule Engine for Query Transformation in Starburst and IBM DB2 C/S DBMS: The Missing Manual", In Proceedings of 13th International Conference on Data Engineering, Apr. 7-11, 1997, pp. 391-400.

Query Rewrite Optimization Guidelines, accessed at: http://publib.boulder.ibm.com/infocenter/db2luw/v9r7/index.jsp?topic=%2Fcom.ibm.db2.luw.admin.perf.doc%2Fdoc%2Fc0024525.html, accessed on Sep. 5, 2011, 4 pages.

Rittman, Mark, Advanced Development Techniques using OBIEE Plus, accessed at http://www.rittmanmead.com/files/Advanced%20Development%20Techniques%20Using%20OBIEE%20Plus.pdf accessed on Sep. 5, 2011, 86 pages Set operations (SQL), accessed at http://en.wikipedia.org/wiki/Set_operations_(SQL), accessed on Sep. 5, 2011, 4 pages.

Shankar, et al., "An ECA-P Policy-based Framework for Managing Ubiquitous Computing Environments", In Proceedings of the Second Annual International Conference on Mobile and Ubiquitous Systems: Networking and Services, Jul. 17-21, 2005, 10 pages.

Shankar, et al., "Specification-enhanced Policies for Automated Management of Changes in IT Systems", In Proceedings of the 20th conference on Large Installation System Administration, 2006, 16 pages.

"Symantec Endpoint Protection 11.0", Retrieved on: Sep. 13, 2011, Available at: http://www.symantec.com/ avcenter/security/ADC/Configuring_Application_Control_1.1.pdf.

Update Statement, accessed at: http://publib.boulder.ibm.com/infocenter/db2luw/v8/index.jsp?topic=/com.ibm.db2.udb.doc/admin/r0001022.htm accessed on Sep. 5, 2011, 9 pages.

"What is Visitor Traffic & Analytic Rules and How is it Setup?", Retrieved on: Sep. 2, 2011, Available at: http://www.americommerce.com/kb/afmviewfaq.aspx?faqid=297.

PCT Search Report dated Mar. 11, 2013 in Appln No. PCT/US2012/063134.

PCT Search Report dated Mar. 28, 2013 in Appln No. PCT/US2012/063135.

(56) References Cited

OTHER PUBLICATIONS

Chinese Office Action and Search Report dated Jan. 7, 2015 in Appln No. 201210428079.9, 12 pgs.
Chinese Office Action and Search Report dated Jan. 23, 2015 in Appln No. 201210429730.4, 15 pgs.
EP Extended Search Report dated Aug. 31, 2015 in Appln No. PCT/US2012/063134, 8 pgs.
U.S. Official Action mailed May 8, 2013 in U.S. Appl. No. 13/287,645, 23 pgs.
U.S. Official Action mailed Sep. 30, 2013 in U.S. Appl. No. 13/287,717, 28 pgs.
U.S. Official Action mailed Dec. 3, 2013 in U.S. Appl. No. 13/287,645, 20 pgs.
U.S. Official Action mailed Jan. 17, 2014 in U.S. Appl. No. 13/287,997, 25 pgs.
U.S. Official Action mailed Feb. 6, 2014 in U.S. Appl. No. 13/287,999, 29 pgs.
U.S. Official Action mailed May 8, 2014 in U.S. Appl. No. 13/287,717, 22 pgs.
U.S. Official Action mailed May 22, 2014 in U.S. Appl. No. 13/287,645, 25 pgs.
U.S. Official Action mailed Jun. 17, 2014 in U.S. Appl. No. 13/287,997, 18 pgs.
U.S. Official Action mailed Jun. 17, 2014 in U.S. Appl. No. 13/287,999, 19 pgs.
U.S. Official Action mailed Jan. 9, 2015 in U.S. Appl. No. 13/287,717, 23 pgs.
U.S. Official Action mailed Mar. 16, 2015 in U.S. Appl. No. 13/287,645, 24 pgs.
U.S. Official Action mailed Apr. 24, 2015 in U.S. Appl. No. 13/287,999, 25 pgs.
U.S. Official Action mailed May 4, 2015 in U.S. Appl. No. 13/287,997, 23 pgs.
Notice of Allowance mailed Jun. 30, 2015 in U.S. Appl. No. 13/287,717, 15 pgs.
Notice of Allowance mailed Jul. 8, 2015 in U.S. Appl. No. 13/287,645, 11 pgs.
Chinese 3rd Office Action in Application 201210429730.4, mailed May 27, 2016, 16 pgs.
Japanese Office Action in 200993648, mailed Jul. 4, 2016, 12 pages.
U.S. Appl. No. 13/287,997, Notice of Allowance mailed Sep. 26, 2016, 7 pages.
Mexican Office Action in MX/a/2014/005402, mailed Aug. 30, 2016, 2 pages. (No English Translation).
Russian Office Action in Application 2014117708, mailed Sep. 27, 2016, 6 pgs. (No English translation).
Chinese 4th Office Action in Application 201210429730.4, mailed Nov. 22, 2016, 12 pgs.
Chinese Notice of Allowance in 201210428079.9, mailed Sep. 17, 2015, 4 pages.
Chinese Office Action in 201210429730.4, mailed Nov. 30, 2015, 11 pages.
U.S. Appl. No. 13/287,997, Office Action mailed Oct. 14, 2015, 17 pages.
U.S. Appl. No. 13/287,997, Office Action mailed May 3, 2016, 19 pages.
Chinese Notice of Allowance in Application 201210429730.4, dated Apr. 27, 2017, 4 pgs.

* cited by examiner

INHERITANCE OF RULES ACROSS HIERARCHICAL LEVELS

CROSS-REFERENCE TO RELATED APPLICATIONS

This application is a continuation application and claims priority to U.S. patent application Ser. No. 13/287,645, filed Nov. 2, 2011, entitled "INHERITANCE OF RULES ACROSS HIERARCHICAL LEVELS," now issued U.S. Pat. No. 9,189,563, which application is incorporated herein by reference in its entirety.

BACKGROUND

Many services and programs use rules for configuring and defining the operation of the program. Some of the rules may be set by a system administrator, some rules may be set by a user of the system, while other rules may be set by other administrators at other levels within a hierarchy of the system. For example, a search service may have an administrator for the overall search service that sets rules and administrators for smaller portions of the search service (e.g. a site collection). Configuring and managing all of these different rules can be a complex task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Rules, such as condition-action rules, are configured at different levels of a hierarchy. For example, a top level site administrator may configure rules, lower level administrators may configure rules and end users may configure rules. Rules created at a higher hierarchical level are automatically inherited by lower hierarchical levels in the same branch of the hierarchy. The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create a local copy of the rule that is editable. Rules may be ordered and when a lower hierarchical level inherits the rules, the ordering is preserved. While the ordering of any rules remains constant when inherited at the lower levels, the lower level may toggle on/off the execution of each rule within the ordering.

DETAILED DESCRIPTION

Figure 1:
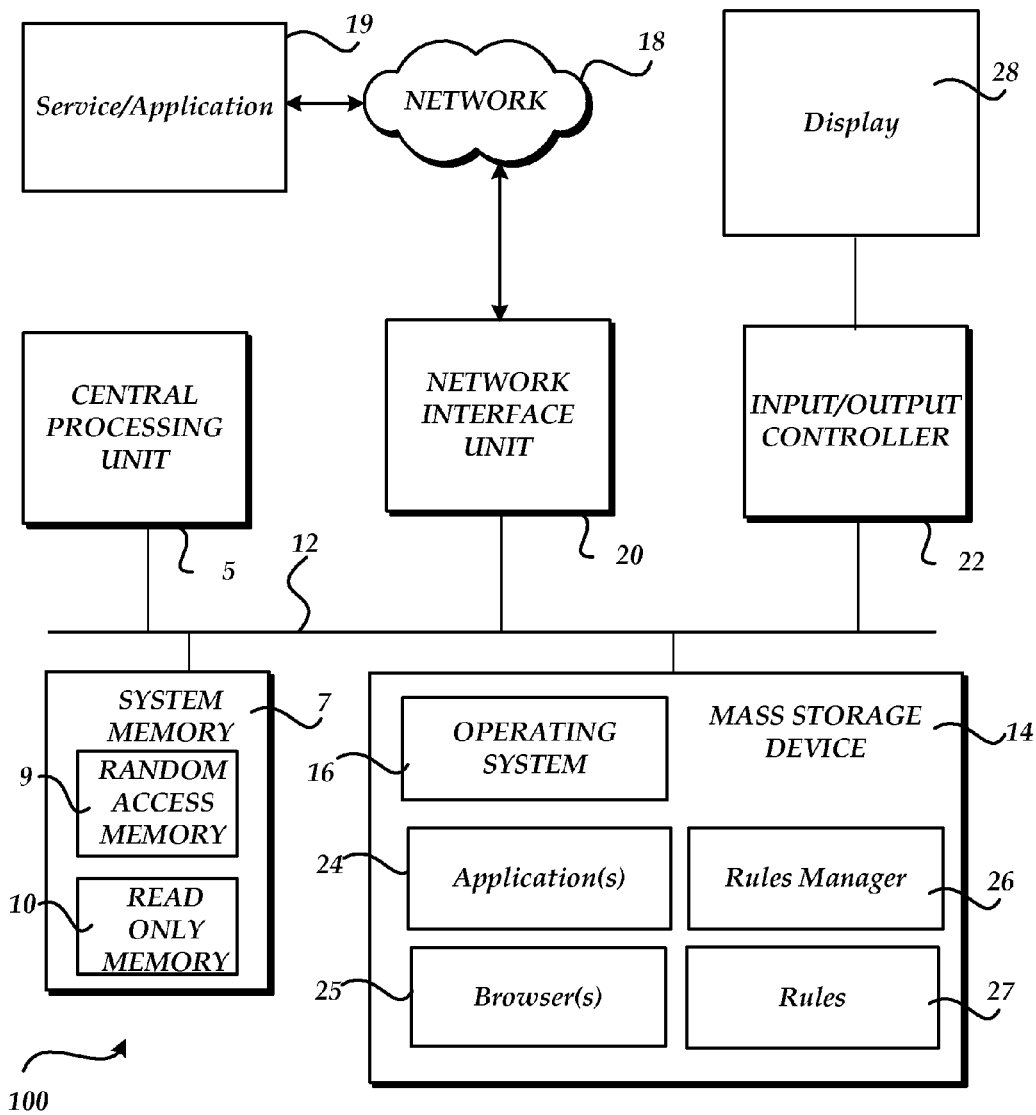
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a server computing device, a desktop computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser applications 25, rules 27, and rules manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS SERVER®, WINDOWS 7® operating systems from MICROSOFT CORPORATION of Redmond, Wash.

The mass storage device 14 and RAM 9 may also store one or more program modules. In particular, the mass storage device 14 and the RAM 9 may store one or more applications 24, such as productivity applications, and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION.

Rules manager 26 is configured to display and interact with rules at different hierarchical levels. Rules manager 26 may be a part of many different applications/services. For example, rules manager 26 may be a part of a cloud based multi-tenant service that provides resources (e.g. services, data . . . ) to different tenants. Rules manager 26 may be a part of other programs/services 19, such as, but not limited to: email, security (e.g. firewalls), search, and the like. According to an embodiment, rules manager 26 operates with MICROSOFT SHAREPOINT. Generally, rules, such as condition-action rules, are configured by different users/administrators at different levels of a hierarchy. For example, a top level site administrator may configure rules, lower level administrators may configure rules and an end user may configure rules. Rules created at a higher hierarchical level are automatically inherited by lower hierarchical levels in the same branch of the hierarchy (e.g. a sibling does not inherit a rule from a same hierarchical level). The source of the inherited rule is indicated with its display such that the hierarchical level of creation can readily be determined. The inherited rule(s) may be toggled on/off at the lower hierarchical levels but edits to inherited rule(s) are restricted. Instead, a copy of any inherited rule may be made to create an editable local copy of the rule. Rules may be ordered and when a lower hierarchical level inherits the rules, the ordering is preserved. The ordering of any hard-ordered rules remains constant at the lower levels, but the lower level may toggle on/off the execution of each rule within the ordering. Additional details regarding the operation of rules manager 26 will be provided below.

Figure 2:
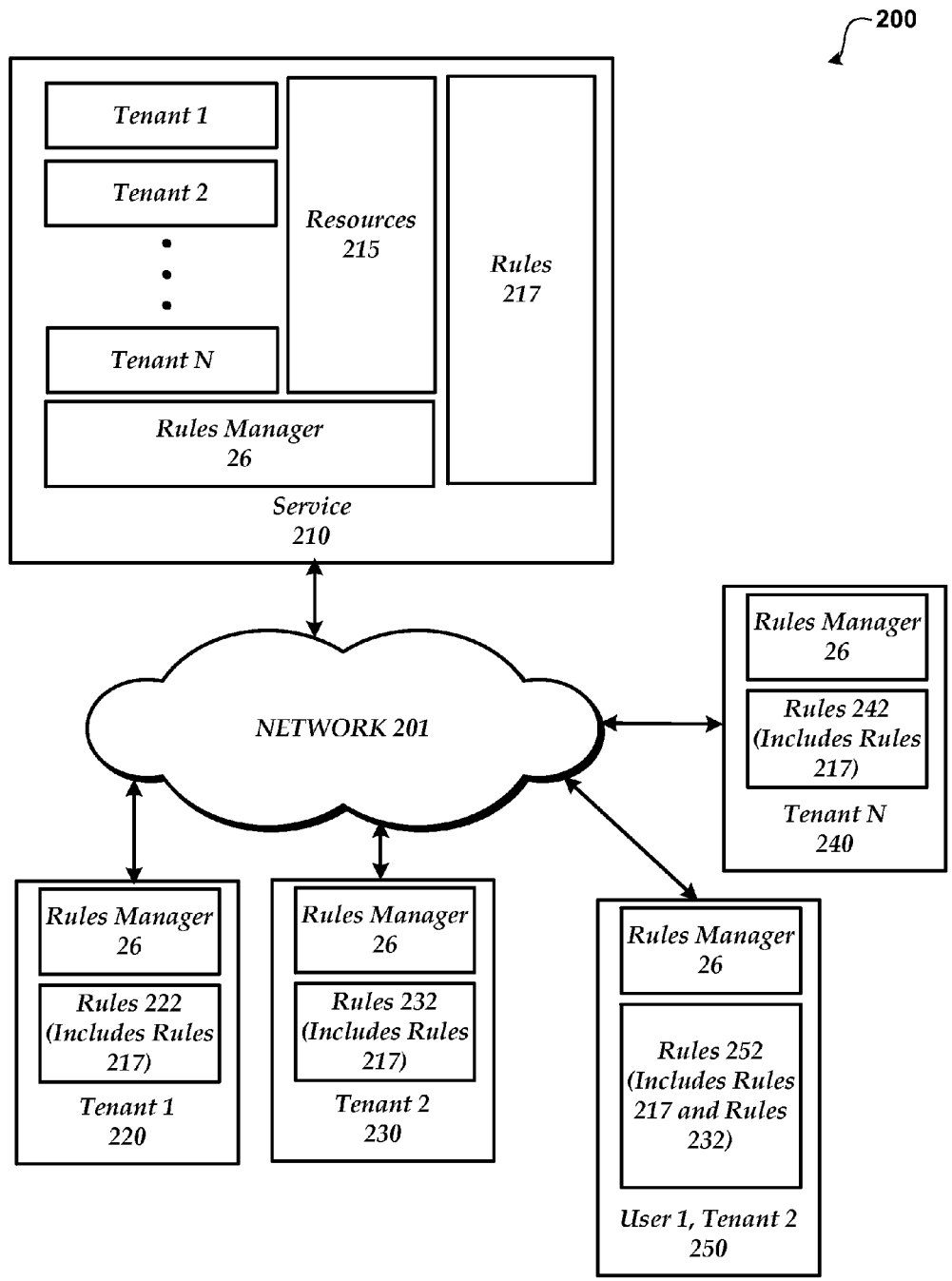
FIG. 2 illustrates an exemplary system for configuring rules at different hierarchical levels.

FIG. 2 illustrates an exemplary system for configuring rules at different hierarchical levels. As illustrated, system 200 includes service 210, tenant 1 (220), tenant 2 (230), tenant N (240), user 1 of tenant 2 (250) and network 201. Rules may be configured for other services/programs. The illustration of service 210 is for explanatory purposes and is not intended to be limiting.

As illustrated, service 210 is a multi-tenant service that provides resources 215 and services to any number of tenants (e.g. Tenants 1-N). According to an embodiment, multi-tenant service 210 is a cloud based service that provides resources/services to tenants subscribed to the service and maintains each tenant's data separately and protected from other tenant data. For example, service 210 may be configured to provide services corresponding to productivity applications (e.g. word processing, spreadsheet, presentation, messaging . . . ), security applications, data management applications, data sharing applications, and the like.

As illustrated, rules 217 are condition-action rules that are configured by one or more users/administrators at different hierarchical levels for the service. Rules 217 may store all/portion of the rules for one or more of the hierarchical levels. For example, rules 217 may store the rules for each of the different hierarchical levels. Rules may also/alternatively be stored at other locations. For example, the rules for each hierarchical level may be distributed across each the different hierarchical levels.

One or more rules manager 26 may be included within the system. For example, a single rules manager 26 may be utilized within service 210 and/or a rules manager may be included at other locations (e.g. each tenant and user as illustrated in 220, 230, 240 and 250). The distributed rules managers may be configured to interact with each other. For example, rules manager 26 on Tenant 1 may be configured to provide a local rules manager for tenant 1 that communicates rule information to the rules manager 26 of service 210. The following is an example flow of creating rules at different hierarchical levels for service 210.

In the current example, Tenants 1-N have one or more administrators/users at a lower hierarchical level from one or more administrators of service 210. Tenant 1 includes inherited rules 217 developed by an administrator of service 210 and local rules 222 that were created by Tenant 1. Tenant 2 includes inherited rules 217 developed by an administrator of service 210 and local rules 232 that were created by Tenant 2. Tenant N includes inherited rules 217 developed by an administrator of service 210 and local rules 232 that were created by Tenant N. User 1 of Tenant 2 (250) includes inherited rules 217 developed by an administrator of service 210, inherited rules 232 that were created by Tenant 2 (230) and local rules 252 that were created by user 1 of tenant 2.

Whenever a rule is created/changed at a higher level within the hierarchy, the rule is automatically incorporated within the lower hierarchical levels within the same branch of the hierarchy. The source of the inherited rule is indicated with its display such that the hierarchical level of creation can readily be determined. For example, the name of the rule may include the name of the administrator and/or level that created the rule (See FIG. 3). The inherited rule(s) may be toggled on/off at the lower hierarchical levels. According to an embodiment, inherited rules are non-editable. Instead, a copy of an inherited rule may be made to create an editable local copy of the rule. A rule may toggled on/off at any level within the hierarchy. Toggling on/off the rule at a higher level within the hierarchy is reflected in lower hierarchical levels. According to an embodiment, when a lower level has previously toggled off the rule, toggling the rule on/off at a higher level within the hierarchy is not propagated to the hierarchical level that already has the rule turned off.

Rules may be ordered and when a lower hierarchical level inherits the rules, the ordering is preserved. The ordering of any hard-ordered rules remains constant at the lower levels, but the lower level may toggle on/off the execution of each rule within the ordering.

Execution of the rules can be configured by the program/service to which they apply. According to an embodiment, rules from a higher level within the hierarchy are fired/executed before rules at lower levels within the hierarchy and hard-ordered rules are fired in the order specified. Different configuration of rule execution may be made depending on the service/program.

Figure 3:
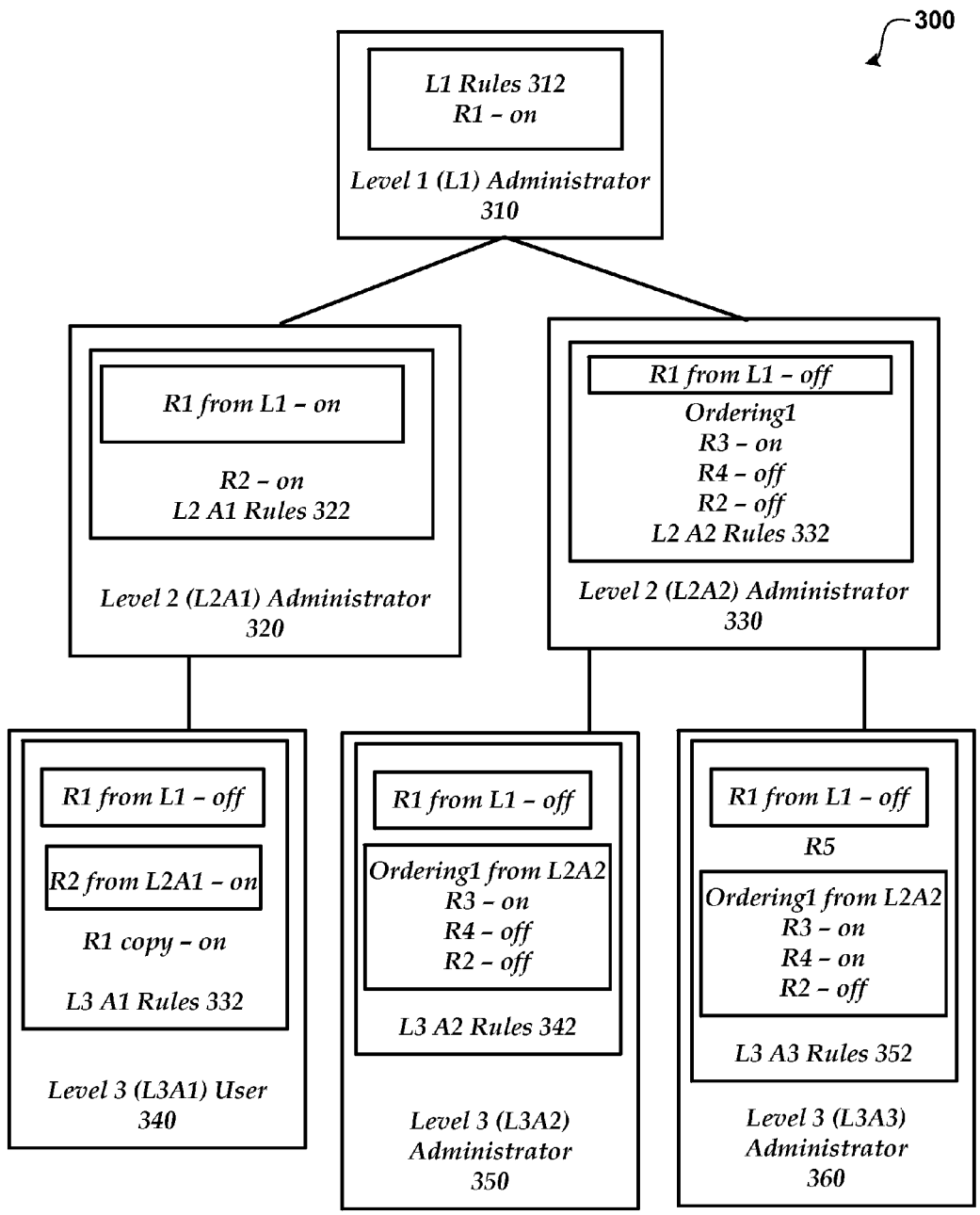
FIG. 3 shows a hierarchy of rules configured by different administrators/users within the hierarchy.

FIG. 3 shows a hierarchy of rules configured by different administrators/users within the hierarchy. As illustrated rules hierarchy 300 includes level 1 (L1) administrator 310, level 2 (L2A1) administrator 320, level 2 (L2A2) administrator 330, level 3 (L3A1) user 340, level 3 (L3A2) administrator 350 and level 3 (L3A3) administrator 360. More of fewer hierarchical levels may be included.

As illustrated, L1 at level 1 has configured one rule (R1) that is currently toggled on. Each hierarchical level below level 1 (level 2 and level 3) inherit rule R1. According to an embodiment, when a rule is inherited by a level, descriptive information is included that shows what level and/or who created the rule. For example, referring to box 322 it can be seen rule R1 came from level 1 (L1). Other naming schemes may be used. For example, rules from different levels may be shown in different colors/fonts, a rule may include a name of the creator, and the like. Rule R2 in box 322 is a rule created at level 2 by L2A1.

Inherited rules can be toggled on/off. In the current example, L2A2 (330) and L3A1 (340) has toggled rule R1 off. Toggling on/off a rule may occur at any time. When a user/administrator toggles on/off a rule at a higher level it is changed at the lower levels. In the current example, L2A2 toggling R1 off caused R1 at level 3 for L3A2 L3A3 to be toggled off. According to an embodiment, when a user at a lower level toggles off a rule and it is toggled at a higher level, the change to the rule is not automatically propagated.

Changes to a sibling's rules do not affect each other. For example, if L2A1 makes a change to a rule (e.g. creates a new rule, toggles a rule on/off, changes an ordering) that change is not propagated to its sibling L2A2. The changes are, however, automatically reflected in the children of L2A1 (in this example, L3A1).

According to an embodiment, inherited rules are not changeable. Instead, an inherited rule may be copied to create an editable local copy. For example, L3A1 (340) has created a copy of R1 that is editable.

Rules may be ordered such that a specific firing of the rules is created (hard ordering). In the current example, L2A2 has created an ordering of rules (Ordering1) that is inherited by the lower hierarchical levels within the same branch (L3A2 and L3A3). As with a single inherited rule, an ordering of rules is non-editable but the ordering may be copied and each rule within the ordering may be toggled on/off. For example, L3A3 has toggled rule R4 on.

Figure 4:
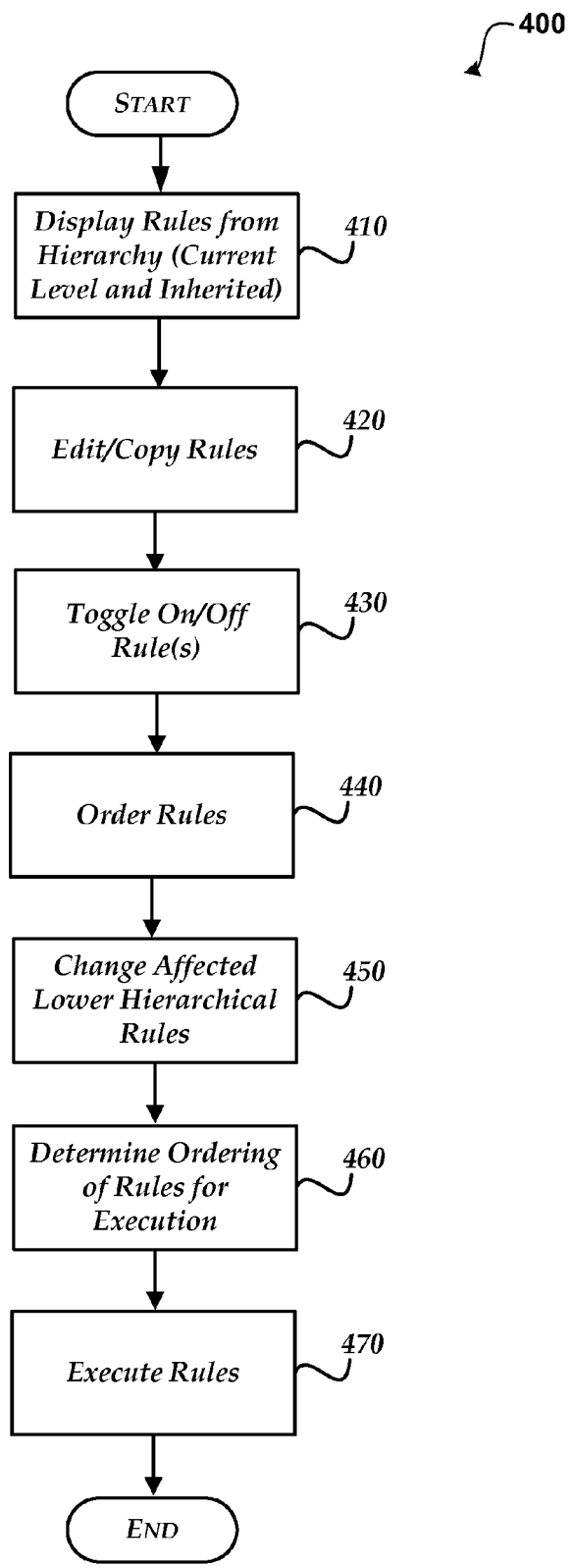
FIG. 4 shows an illustrative processes for configuring rules at different hierarchical levels.

FIG. 4 shows an illustrative processes for configuring rules at different hierarchical levels. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 400 flows to operation 410, where rules from the hierarchy are displayed. The rules include the rules created at the current hierarchical level along with inherited rules from higher levels within the hierarchy. According to an embodiment, when a change is made to a rule at a higher level within the hierarchy it is automatically reflected and updated in the display at the lower hierarchical level(s).

Moving to operation 420, an authorized user/administrator may edit/copy rules. As discussed above, inherited rules may be copied to create an editable local copy of the rule on that level. An authorized user may also create new rules at the hierarchical level. Rules created at the hierarchical level of the displayed rules may also be edited/changed. Copied rules and newly created/edited rules are automatically propagated to the lower levels.

Flowing to operation 430, any of the displayed rules may be toggled on/off. For example, a rule from one or more levels may be toggled on/off. As discussed above, toggling a rule at a higher level toggles the rule at the lower hierarchical levels unless the lower level has already explicitly toggled the rule to off.

Transitioning to operation 440, an ordering of the rules may be performed. A user may order rules that were not inherited as ordered. According to an embodiment, an inherited set of ordered rules is not changeable at a lower level. Instead, a user at the lower level would create a copy of the ordered rules and reconfigure the ordering of the local copy. The user may then toggle off the rules in the inherited ordering.

Moving to operation 450, changed rules are automatically propagated to the lower levels. The rules may be automatically propagated based on different conditions. For example, a change to a rule may be automatically propagated in response to any change to the rule, at pre-determined times (e.g. check for rule changes every 5, 10, 30, 60 minutes, once a day, and the like), in response to a selection to activate the change, and the like.

Flowing to operation 460 an ordering of the rules for execution is determined. The execution of the rules may be configured differently depending on the system. For example, some services/programs may allow rules to be fired in parallel while other services/programs follow a specified order of execution. According to an embodiment, rules are fired according to hierarchical level (e.g. top level rules fired before lower level rules) and whether the rules are ordered (when ordered the rules are executed in arranged order).

Transitioning to operation 470, the rules are executed according to the determined order.

The process then moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for defining rules associated with a performance of an application at different hierarchical levels by different users, comprising:
   displaying rules including determined rules from a determined hierarchical level and inherited rules from hierarchical levels above the determined hierarchical level to form displayed rules, wherein any rules created at a hierarchical level above the determined hierarchical level are automatically inherited by lower hierarchical levels;
   distinguishing the inherited rules from the determined rules from the determined hierarchical level within a display;
   preventing editing and deleting of the inherited rules;
   receiving a change to the displayed rules;
   determining that the determined hierarchical level is above a lowest hierarchical level; and
   in response to determining that the determined hierarchical level is above the lowest hierarchical level, automatically providing the change to each lower hierarchical level such that the determined rules are displayed at each of the lower hierarchical levels and the change made to the displayed rules is shown.

2. The method of claim 1, wherein receiving the change to the displayed rules comprises determining when a rule is enabled and when the rule is disabled, wherein the inherited rules can be enabled and disabled at each of the hierarchical levels.

3. The method of claim 1, wherein receiving the change to the displayed rules comprises determining when a rule is added.

4. The method of claim 1, wherein receiving the change to the displayed rules comprises determining an ordering of the displayed rules.

5. The method of claim 1, wherein receiving the change to the displayed rules comprises determining when an inherited rule is copied and creating a local version of the inherited rule that is editable and can be deleted.

6. The method of claim 1, wherein distinguishing the inherited rules comprises displaying an indicator that indicates a level where an inherited rule was created, wherein the indicator is a name near the display of the inherited rule.

7. The method of claim 1, wherein distinguishing the inherited rules comprises displaying ordered inherited rules as a grouping and indicating a name near a display of the ordered inherited rules that indicates a level where the ordering was created.

8. The method of claim 1, further comprising preventing an ordering of inherited rules from being changed at a lower hierarchical level but allowing each of the inherited rules within the ordering to be enabled or disabled.

9. The method of claim 1, further comprising executing the displayed rules based on an ordering of the displayed rules determined from the hierarchical levels of the displayed rules and any explicit ordering of the displayed rules.

10. A computer storage device having computer-executable instructions for defining rules associated with a performance of an application at different hierarchical levels by different users, comprising:
    displaying the rules including current rules from a current hierarchical level and inherited rules from hierarchical levels above the current hierarchical level to form displayed rules, wherein any rules created at a hierarchical level above the current hierarchical level are automatically inherited by lower hierarchical levels in a same branch of hierarchy;
    distinguishing the inherited rules from the current rules from the current hierarchical level within a display;
    preventing editing and deleting of the inherited rules and allowing enabling and disabling of the inherited rules;
    receiving a change to the displayed rules;
    determining that the current hierarchical level is above a lowest hierarchical level; and
    in response to determining that the current hierarchical level is above the lowest hierarchical level, automatically providing the change to each lower hierarchical level such that when the inherited rules are displayed at each of the lower hierarchical levels the change made to the displayed rules is shown.

11. The computer storage device of claim 10, wherein receiving the change to the displayed rules comprises determining when a rule is added.

12. The computer storage device of claim 10, wherein receiving the change to the displayed rules comprises receiving a specific ordering of a subset of the displayed rules.

13. The computer storage device of claim 10, wherein receiving the change to the displayed rules comprises creating a local version of an inherited rule that is editable and can be deleted at the current hierarchical level.

14. The computer storage device of claim 10, wherein distinguishing the inherited rules comprises displaying an indicator that indicates a level where an inherited rule was created.

15. The computer storage device of claim 10, wherein distinguishing the inherited rules comprises displaying ordered rules as a grouping and indicating a name near a display of the ordered rules that indicates a level where the ordering was created.

16. The computer storage device of claim 10, further comprising preventing an ordering of the inherited rules from being changed at a lower hierarchical level but allowing each of the inherited rules within the ordering to be enabled or disabled.

17. A system for defining rules associated with a performance of an application at different hierarchical levels by different users, comprising:
    a network connection that is coupled to tenants of a multi-tenant service;
    a processor and a computer-readable medium;
    an operating environment stored on the computer-readable medium and executing on the processor; and a rules manager operating under a control of the operating environment and operative to:

displaying the rules including current rules from a current hierarchical level and inherited rules from hierarchical levels above the current hierarchical level to form displayed rules, wherein any rules created at a hierarchical level above the current hierarchical level are automatically inherited by lower hierarchical levels in a same branch of hierarchy;

distinguishing the inherited rules from the current rules from the current hierarchical level within a display;

preventing editing and deleting of the inherited rules and allowing enabling and disabling of the inherited rules;

receiving a change to the displayed rules;

determining that the current hierarchical level is above a lowest hierarchical level; and in response to determining that the current hierarchical level is above the lowest hierarchical level, automatically providing the change to each lower hierarchical level such that when the inherited rules are displayed at each of the lower hierarchical levels the change made to the displayed rules is shown.

18. The system of claim 17, wherein receiving the change to the displayed rules comprises at least one of:
determining when a rule is added;
receiving a specific ordering of a subset of the displayed rules; and
creating a local version of an inherited rule that is editable and can be deleted at the current hierarchical level.

19. The system of claim 17, wherein distinguishing the inherited rules comprises displaying an indicator that indicates a level where an inherited rule was created and displaying ordered inherited rules as a grouping and indicating a name near a display of the ordered inherited rules that indicates the level where the ordering was created.

20. The system of claim 17, further comprising preventing an ordering of inherited rules from being changed at a lower hierarchical level but allowing each of the inherited rules within the ordering to be enabled or disabled.

* * * * *